(12) United States Patent
Gupta et al.

(10) Patent No.: US 12,080,080 B2
(45) Date of Patent: Sep. 3, 2024

(54) DETECTION, CLASSIFICATION, AND PREDICTION OF BACTERIA COLONY GROWTH IN VEHICLE PASSENGER CABIN

(71) Applicant: Toyota Motor Engineering & Manufacturing North America, Inc., Plano, TX (US)

(72) Inventors: Rohit Gupta, Santa Clara, CA (US); Ziran Wang, San Jose, CA (US); Yanbing Wang, Nashville, TN (US); Kyungtae Han, Palo Alto, CA (US); Prashant Tiwari, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 533 days.

(21) Appl. No.: 17/373,050

(22) Filed: Jul. 12, 2021

(65) Prior Publication Data
US 2023/0008646 A1    Jan. 12, 2023

(51) Int. Cl.
| | |
|---|---|
| *G06V 20/59* | (2022.01) |
| *G06F 18/214* | (2023.01) |
| *G06F 18/2413* | (2023.01) |
| *G06N 3/045* | (2023.01) |
| *G06N 3/08* | (2023.01) |
| *G06V 20/69* | (2022.01) |
| *G08B 7/06* | (2006.01) |

(52) U.S. Cl.
CPC ............ *G06V 20/59* (2022.01); *G06F 18/214* (2023.01); *G06F 18/2413* (2023.01); *G06N 3/045* (2023.01); *G06N 3/08* (2013.01); *G06V 20/698* (2022.01); *G08B 7/06* (2013.01)

(58) Field of Classification Search
None
See application file for complete search history.

(56) References Cited

U.S. PATENT DOCUMENTS

| | | |
|---|---|---|
| 6,991,532 B2 | 1/2006 | Goldsmith |
| 10,089,540 B2 | 10/2018 | May et al. |

(Continued)

FOREIGN PATENT DOCUMENTS

| | | |
|---|---|---|
| EP | 1189790 A1 | 3/2002 |
| EP | 1422089 A2 | 5/2004 |

OTHER PUBLICATIONS

Stephenson et al., "Elucidation of bacteria found in car interiors and strategies to reduce the presence of potential pathogens," Biofouling, vol. 30, No. 3, Mar. 2014, pp. 337-346.

(Continued)

*Primary Examiner* — Leon Viet Q Nguyen
(74) *Attorney, Agent, or Firm* — Jordan IP Law, LLC (57) ABSTRACT

Systems, methods, and computer program products that are configured to identify or otherwise detect the presence of bacteria, classify the identified or detected bacteria, and also predict the growth of the classified bacteria on various touchable surfaces within a vehicle passenger cabin or compartment. Such systems, methods, and computer program products are configured to identify/detect, classify, and predict the presence and/or growth of bacteria, and transmit one or more alerts, warnings, and/or reports to vehicle owners, service providers, and/or occupants based on the identification/detection, classification, and prediction.

17 Claims, 9 Drawing Sheets

(56) References Cited

U.S. PATENT DOCUMENTS

| | | |
|---|---|---|
| 10,304,165 B2 | 5/2019 | Tokatyan |
| 10,721,375 B1 | 7/2020 | Boyd et al. |
| 10,902,553 B2 | 1/2021 | Dawson |
| 2009/0150090 A1 | 6/2009 | Brodsky |
| 2010/0241306 A1 | 9/2010 | Akisada et al. |
| 2011/0171065 A1 | 7/2011 | Park et al. |
| 2011/0203931 A1 | 8/2011 | Novosselov et al. |
| 2017/0096631 A1 | 4/2017 | Uematsu et al. |
| 2021/0040530 A1* | 2/2021 | Balagurusamy ...... G06T 7/0012 |
| 2021/0295506 A1* | 9/2021 | Whitehead ............. G06V 10/56 |
| 2022/0371604 A1* | 11/2022 | Katti .................... B60W 40/08 |

OTHER PUBLICATIONS

Wang et al., "Early-detection and classification of live bacteria using time-lapse coherent imaging and deep learning," Light: Science & Applications 9, Article No. 118, Jul. 10, 2020, 24 pages.

* cited by examiner

DETECTION, CLASSIFICATION, AND PREDICTION OF BACTERIA COLONY GROWTH IN VEHICLE PASSENGER CABIN

TECHNICAL FIELD

Embodiments relate generally to systems, methods, and computer program products for detecting, classifying, and predicting bacteria growth on surfaces in a vehicle passenger compartment or cabin.

BACKGROUND

A vehicle can have hundreds of different germs, pathogenic bacteria, and biological contaminants populated on touchable surfaces within the passenger cabin or compartment. There are approximately seven hundred different strains of pathogenic bacteria living in the average motor vehicle, including staphylococcus and propionibacterium. Such pathogenic bacteria can exist on touchable surfaces for months, and contribute to transmission of pathogens to vehicle occupants who come into contact therewith.

BRIEF SUMMARY

One or more embodiments relate to systems, methods, and computer program products that are configured to identify or otherwise detect the presence of various bacteria, classify the identified or detected bacteria, and also predict the growth of the classified bacteria on various touchable surfaces within a vehicle passenger cabin or compartment. Such bacteria may include, for example, pathogenic bacteria.

Such systems, methods, and computer program products are configured to identify/detect, classify, and predict the presence and/or growth of bacteria, such as, for example, pathogenic bacteria, and transmit one or more alerts, warnings, and/or reports to vehicle owners, service providers, and/or occupants based on the identification/detection, classification, and prediction. In that way, the vehicle passenger cabin can undergo a cleaning or sanitization process to remove the detected bacteria.

Such systems, methods, and computer program products that are configured to detect and then to predict the growth of bacteria on various touchable surfaces within a vehicle passenger cabin or compartment. Such bacteria may include, for example, pathogenic bacteria.

In one or more embodiments, such systems, methods, and computer program products may comprise one or more onboard optical sensors (e.g., cameras) mounted in the vehicle passenger cabin to capture microscopic images of one or more target surfaces in the vehicle passenger cabin. The image data files of the microscopic images may then be transferred to a remote service via a wireless network or ad-hoc wireless network where a first machine learning algorithm is applied to the captured image data to conduct differential image analysis and thereby identify or detect a presence (or absence) of bacteria in the vehicle passenger cabin bacteria based on stored bacteria image data. Should the determination of bacteria be affirmed, a second convolutional neural network is applied to the image data in order to classify the type of bacteria result based on stored bacteria classification data.

Such systems, methods, and computer program products may be implemented as part of a plurality of models, such as, for example, a vehicle owner model, a vehicle dealership model, a vehicle rideshare model, and a vehicle robotaxi model. In certain models, onboard optical sensors in the vehicle passenger cabin are to capture microscopic images of one or more target surfaces in the vehicle passenger cabin, and then transmit the image data, via a network, to one or more cloud server computers which applies one or more machine learning algorithms for the purpose of identifying/detecting and classifying bacteria, and then predicting the growth of the bacteria. Whereas in other models, a mobile electronic device, linked with a peripheral optical sensing device or having integrated image sensing functionality, is to capture microscopic images of one or more target surfaces in the vehicle passenger cabin, and then transmit the image data, via a network, to one or more cloud server computers which applies one or more machine learning algorithms for the purpose of identifying/detecting and classifying bacteria, and then predicting the growth of the bacteria.

In one or more embodiments, a computer system, comprises one or more of the following: a cloud computing server having one or more processors; and a non-transitory memory operatively coupled to the one or more processors comprising a set of instructions executable by the one or more processors to cause the one or more processors to: receive, from a client system, captured image data relating to one or more microscopic images of one or more target surfaces in a vehicle passenger cabin; and detect a presence of bacteria in the vehicle passenger cabin by applying a first machine learning algorithm to conduct differential image analysis of the captured image data. Such bacteria may include, for example, pathogenic bacteria.

In accordance with such a computing system, prior to applying the first machine learning algorithm, the one or more processors are to execute the set of instructions to train a first convolutional neural network to detect bacteria based on one or more of stored bacteria image data and wireless network bacteria image data.

In accordance with such a computing system, the one or more processors are to execute the set of instructions to train a second convolutional neural network to classify the detected bacteria based on one or more of stored bacteria image data and wireless network bacteria image data. The one or more processors are to then execute the set of instructions to classify, based on the training of the second convolutional neural network, the detected bacteria by applying a second machine learning algorithm to conduct classification analysis of the captured image data.

In accordance with such a computing system, the one or more processors are to execute the set of instructions to train a third convolutional neural network to predict growth of the classified bacteria based on one or more of stored bacteria image data and wireless network bacteria image data. The one or more processors are to then execute the set of instructions to predict, based on the training of the third convolutional neural network, the growth of classified bacteria by applying a third machine learning algorithm to conduct time-lapsed differential image analysis of the captured image data.

In accordance with such a computing system, the one or more processors are to execute the set of instructions to, in response to the detection, send one or more of an audio alert, a visual alert, and a haptic alert to the client system.

In one or more embodiments, a computer program product including at least one computer readable medium comprising a set of instructions, which when executed by one or more processors of a cloud computing server, cause the cloud computing server to: receive, from a client system, captured image data relating to one or more microscopic images of one or more target surfaces in a vehicle passenger cabin; and detect a presence of bacteria in the vehicle passenger cabin by applying a first machine learning algorithm to conduct differential image analysis of the captured image data. Such bacteria may include, for example, pathogenic bacteria.

In accordance with such a computer program product, prior to applying the first machine learning algorithm, the one or more processors are to execute the set of instructions to train a first convolutional neural network to detect bacteria based on one or more of stored bacteria image data and wireless network bacteria image data.

In accordance with such a computer program product, the one or more processors are to execute the set of instructions to train a second convolutional neural network to classify the detected bacteria based on one or more of stored bacteria image data and wireless network bacteria image data. The one or more processors are to then execute the set of instructions to classify, based on the training of the second convolutional neural network, the detected bacteria by applying a second machine learning algorithm to conduct classification analysis of the captured image data.

In accordance with such a computer program product, the one or more processors are to execute the set of instructions to train a third convolutional neural network to predict growth of the classified bacteria based on one or more of stored bacteria image data and wireless network bacteria image data. The one or more processors are to then execute the set of instructions to predict, based on the training of the third convolutional neural network, the growth of classified bacteria by applying a third machine learning algorithm to conduct time-lapsed differential image analysis of the captured image data.

In accordance with such a computer program product, the one or more processors are to execute the set of instructions to, in response to the detection, send one or more of an audio alert, a visual alert, and a haptic alert to the client system.

In one or more embodiments, a method of detecting bacteria in a vehicle passenger cabin, comprising one or more of the following: receiving, from a first client system, captured image data relating to one or more microscopic images of one or more target surfaces in a vehicle passenger cabin; and detecting a presence of bacteria in the vehicle passenger cabin by applying a first machine learning algorithm to conduct differential image analysis of the captured image data. Such bacteria may include, for example, pathogenic bacteria.

In accordance with such a method, prior to applying the first machine learning algorithm, the method further comprises: training a first convolutional neural network to detect bacteria based on one or more of stored bacteria image data and wireless network bacteria image data.

In accordance with such a method, the method further comprises training a second convolutional neural network to classify the detected bacteria based on one or more of stored bacteria image data and wireless network bacteria image data. The method then further comprises classifying, based on the training of the second convolutional neural network, the detected bacteria by applying a second machine learning algorithm to conduct classification analysis of the captured image data.

In accordance with such a method, the method further comprises training a third convolutional neural network to predict growth of the classified bacteria based on one or more of stored bacteria image data and wireless network bacteria image data. The method then further comprises predicting, based on the training of the third convolutional neural network, growth of classified bacteria by applying a third machine learning algorithm to conduct time-lapsed differential image analysis of the captured image data.

In accordance with such a method, the method further comprises sending, in response to the detection, one or more of an audio alert, a visual alert, and a haptic alert to the client system.

BRIEF DESCRIPTION OF THE SEVERAL VIEWS OF THE DRAWINGS

The various advantages of the embodiments will become apparent to one skilled in the art by reading the following specification and appended claims, and by referencing the following drawings, in which:

DETAILED DESCRIPTION

Figure 1:
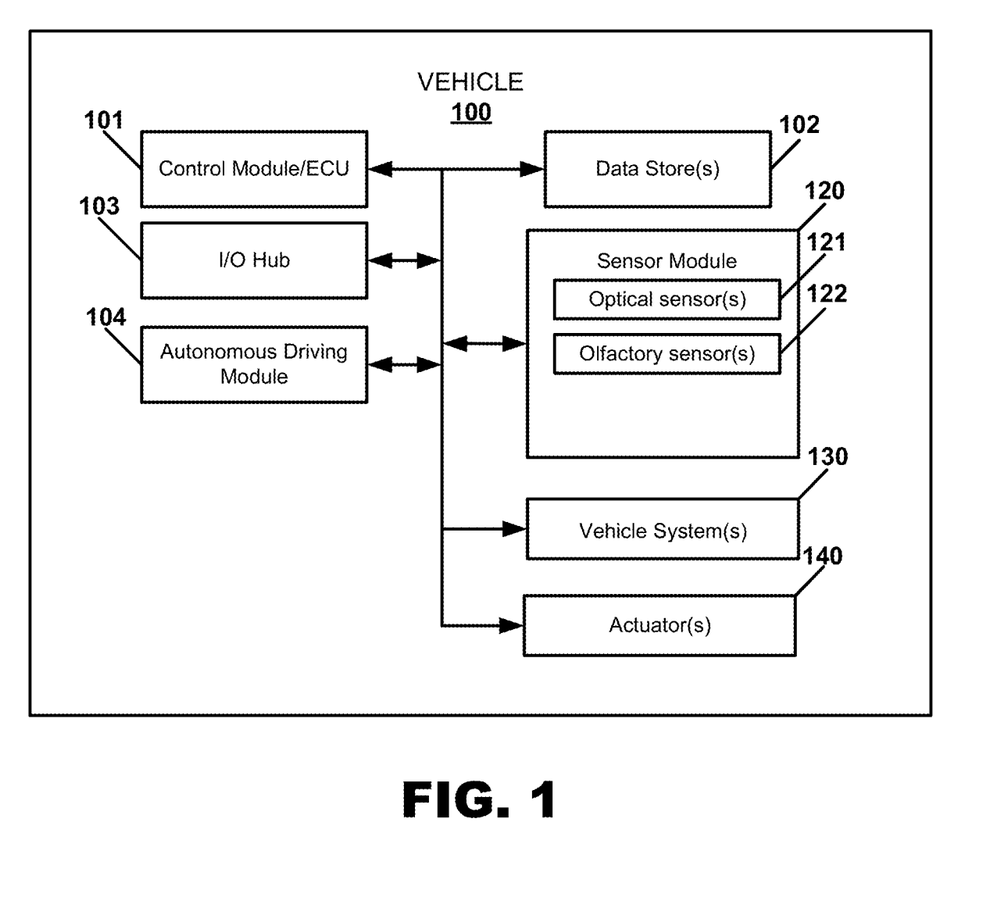
FIG. 1 illustrates an example vehicle, in one or more embodiments shown and described herein.

Turning to the figures, in which FIG. 1 illustrates a vehicle 100 that may comprise a mobility-as-a-service (MaaS) vehicle, a car, a truck, a van, a sport utility vehicle, a bus, a robo-taxi, etc. Embodiments, however, are not limited thereto, and thus, this disclosure contemplates the vehicle 100 comprising any suitable vehicle that falls within the spirit and scope of the principles of this disclosure. For example, the vehicle 100 may comprise a marine vehicle, an air vehicle, a space vehicle, or any other form of transport vehicle.

In one or more embodiments, the vehicle 100 may comprise one or more operational elements, some of which may be a part of an autonomous driving system. Some of the possible operational elements of the vehicle 100 are shown in FIG. 1 and will now be described. It will be understood that it is not necessary for the vehicle 100 to have all the elements illustrated in FIG. 1 and/or described herein. The vehicle 100 may have any combination of the various elements illustrated in FIG. 1. Moreover, the vehicle 100 may have additional elements to those illustrated in FIG. 1.

In one or more embodiments, the vehicle 100 may not include one or more of the elements shown in FIG. 1. Moreover, while the various operational elements are illustrated as being located within the vehicle 100, embodiments are not limited thereto, and thus, one or more of the operational elements may be located external to the vehicle 100, and even physically separated by large spatial distances.

The vehicle 100 comprises a control module/electronic control unit (ECU) 101, one or more data stores 102, an I/O hub 103, an autonomous driving module 104, a sensor module 120, vehicle system 130, and one or more actuators 140.

The control module/electronic control unit (ECU) 101 comprises one or more processors. As set forth, described, and/or illustrated herein, "processor" means any component or group of components that are configured to execute any of the processes described herein or any form of instructions to carry out such processes or cause such processes to be performed. The one or more processors may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors may comprise at least one hardware circuit (e.g., an integrated circuit) configured to carry out instructions contained in program code. In embodiments in which there is a plurality of processors, such processors may work independently from each other, or one or more processors may work in combination with each other. In one or more embodiments, the one or more processors may be a host, main, or primary processor of the vehicle 100.

Figure 2:
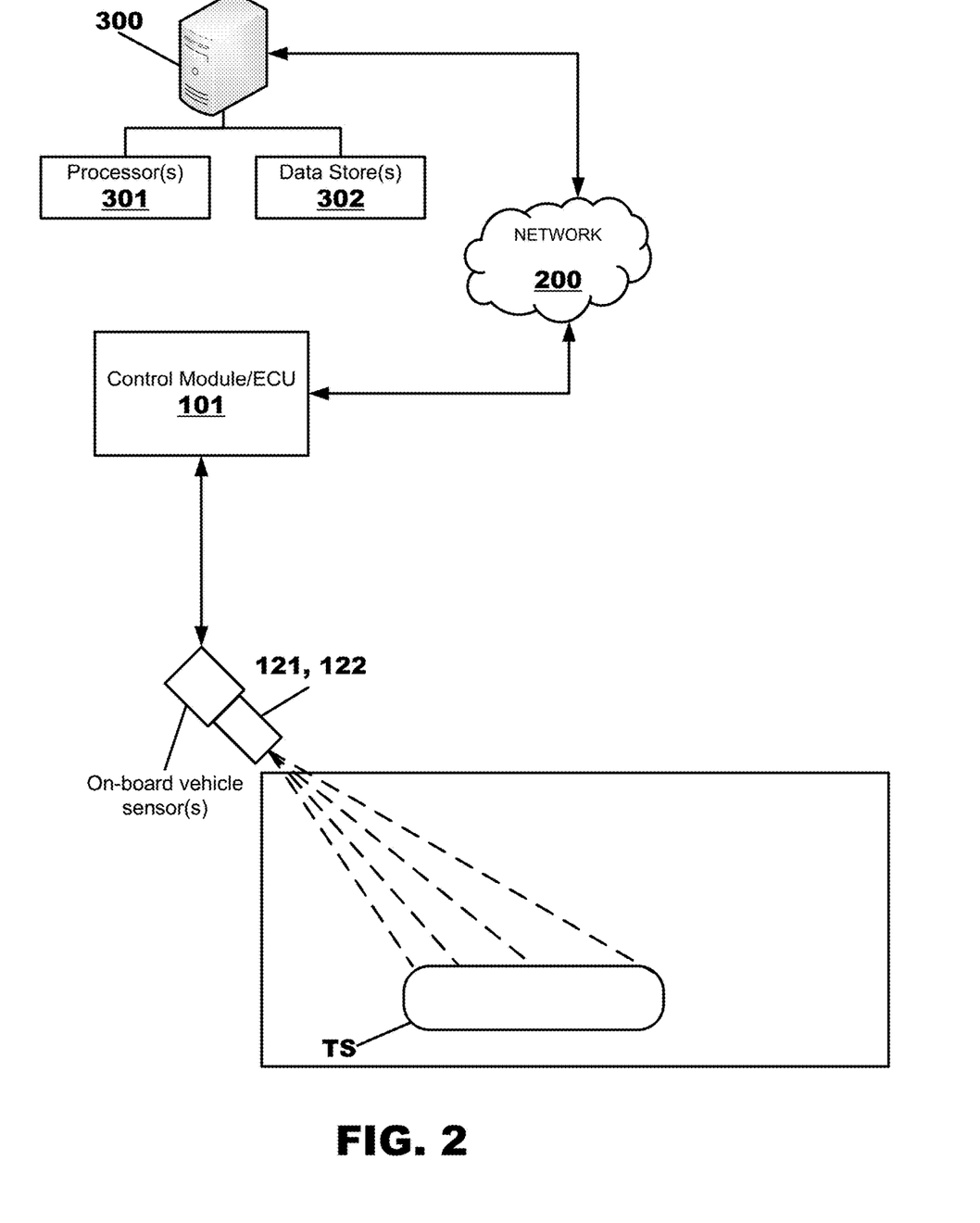
FIG. 2 illustrates an example cloud bacteria detection and classification system for a vehicle, in one or more embodiments shown and described herein.
Figure 3:
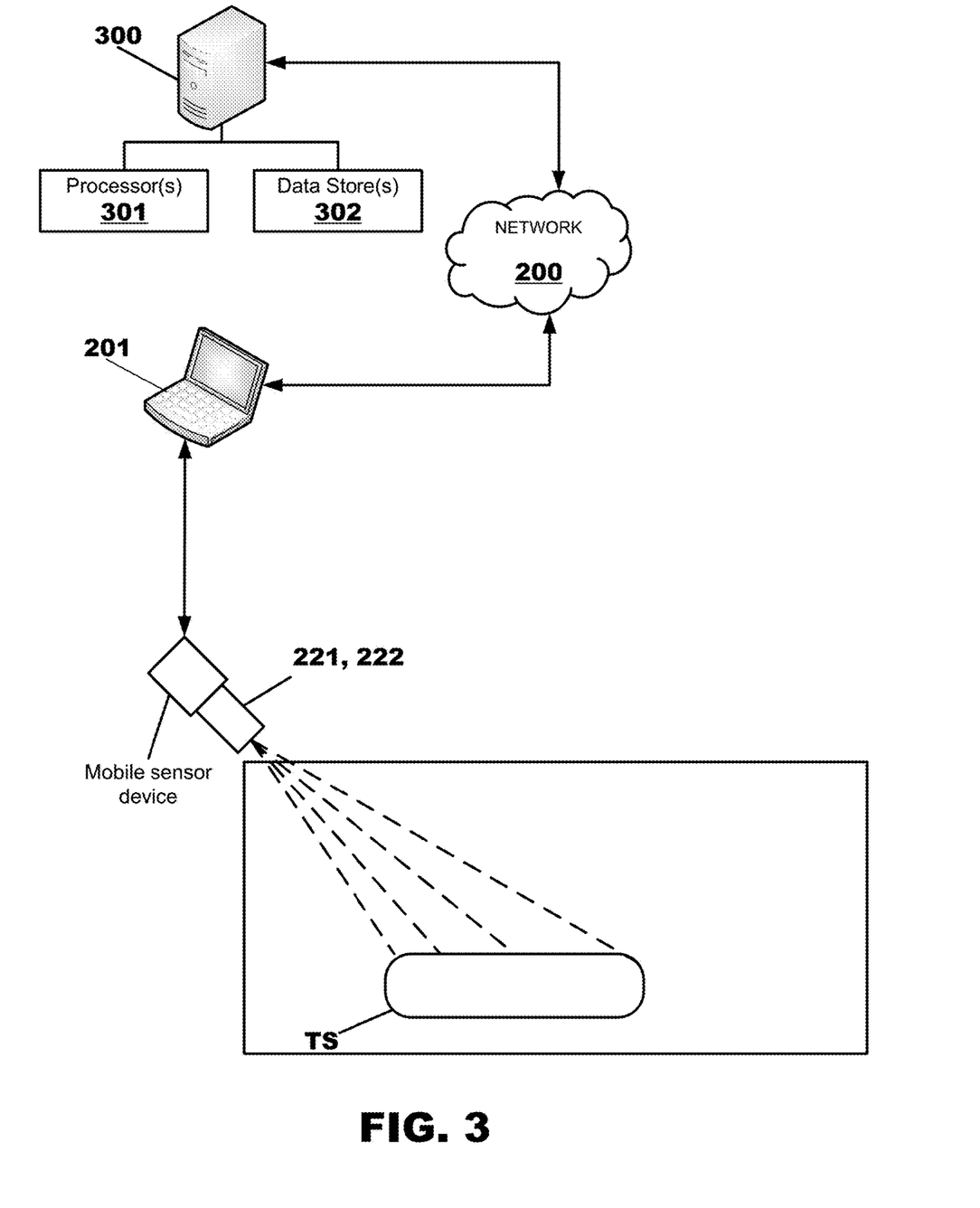
FIG. 3 illustrates an example cloud bacteria detection and classification system for a vehicle, in one or more embodiments shown and described herein.

As illustrated in FIGS. 2 and 3, in one or more embodiments, the control module/electronic control unit (ECU) 101 is configured to receive and transmit one or more data signals via a wireless network 200. The wireless network 200 may be configured to facilitate wireless communication between the vehicle 100 and one or more external source devices, such as one or more network server computers 300 having one or more processors 301 and one or more data stores 302. In one or more embodiments, the one or more processors 301 includes one or more processor cores to process instructions which, when executed, perform operations for system or user software. In one or more embodiments, the one or more processors 301 includes one or more graphics processors to perform graphics processing operations.

In one or more example embodiments, the control module/electronic control unit (ECU) 101 may communicate, via an on-board network controller, with a wireless PAN (WPAN) (such as, for example, a BLUETOOTH WPAN), a WI-FI network, a WI-MAX network, a cellular telephone network (such as, for example, a Global System for Mobile Communications (GSM) network), or a combination thereof. Embodiments, however, are not limited thereto, and thus, this disclosure contemplates any suitable other suitable wireless network architecture that permits practice of the one or more embodiments.

Wireless network data comprises data communicated to one or more of the vehicle 100 and the one or more network server computers 300 that is sourced from external sources. Such externally-sourced data comprises, but is not limited to, one or more of medical data and clinical research from public, private, and governmental sources. Additionally, such externally-sourced data may comprise crowdsourced data. Accordingly, the control module/ECU 101 is configured to receive information from one or more other external source devices to the and process the received information. Information may be received based on preferences including but not limited to location (e.g., as defined by geography from address, zip code, or GPS coordinates), planned travel routes (e.g., global position system (GPS) alerts), activity associated with co-owned/shared vehicles, history, news feeds, and the like. The information (i.e., received or processed information) may also be uplinked to other systems, subsystems, and modules in the vehicle 100 for further processing to discover additional information that may be used to enhance the understanding of the information.

The one or more data stores 102 are configured to store one or more types of data. The vehicle 100 may include interfaces that enable one or more systems thereof to manage, retrieve, modify, add, or delete, the data stored in the data stores 102. The one or more data stores 102 may comprise volatile and/or non-volatile memory. Examples of suitable data stores 102 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 102 may be a component of the processors of the control module/ECU 101, or alternatively, may be operatively connected to the processors for use thereby. As set forth, described, and/or illustrated herein, "operatively connected" may include direct or indirect connections, including connections without direct physical contact.

The I/O hub 103 is operatively connected to other systems and subsystems of the vehicle 100. The I/O hub 103 may comprise an input interface and an output interface. The input interface and the output interface may be integrated as a single, unitary interface, or alternatively, be separate as independent interfaces that are operatively connected.

In one or more embodiments, the input interface may be used by a user, such as, for example, an operator of the vehicle to create one or more calendar events to for automatic sanitization of the vehicle passenger cabin. The input interface is defined herein as any device, component, system, subsystem, element, or arrangement or groups thereof that enable information/data to be entered in a machine. The input interface may receive an input from a vehicle occupant (e.g. a driver or a passenger) or a remote operator of the vehicle 100. In an example, the input interface may comprise a user interface (UI), graphical user interface (GUI) such as, for example, a display, human-machine interface (HMI), or the like. Embodiments, however, are not limited thereto, and thus, the input interface may comprise a keypad, touch screen, multi-touch screen, button, joystick, mouse, trackball, microphone and/or combinations thereof.

The output interface is defined herein as any device, component, system, subsystem, element, or arrangement or groups thereof that enable information/data to be presented to a vehicle occupant and/or remote operator of the vehicle 100. The output interface may be configured to present information/data to the vehicle occupant and/or the remote operator. The output interface may comprise one or more of a visual display or an audio display such as a microphone, earphone, and/or speaker. One or more components of the vehicle 100 may serve as both a component of the input interface and a component of the output interface.

The autonomous driving module 104 may be implemented as computer readable program code that, when executed by a processor, implement one or more of the various processes described herein, including, for example, determining a current driving maneuvers for the vehicle 100, future driving maneuvers and/or modifications. The autonomous driving module 104 may also cause, directly or indirectly, such driving maneuvers or modifications thereto to be implemented. The autonomous driving module 104 may be a component of the control module/ECU 101. Alternatively, the autonomous driving module 104 may be executed on and/or distributed among other processing systems to which the control module/ECU 101 is operatively connected. The autonomous driving module 104 may include instructions (e.g., program logic) executable by the one or more processors of the control module/ECU 101. Such instructions may comprise instructions to execute various vehicle functions and/or to transmit data to, receive data from, interact with, and/or control the vehicle 100 or one or more systems thereof (e.g. one or more subsystems of the vehicle system 130). Alternatively or additionally, the one or more data stores 102 may contain such instructions.

The sensor module 120, comprising one or more image or optical sensors 121 and one or more olfactory sensors 122, is configured to detect, capture, determine, assess, monitor, measure, quantify, and/or sense one or more target surfaces TS within the vehicle passenger cabin. As set forth, described, and/or illustrated herein, "sensor" means any device, component, system, and/or subsystem that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "real-time" means a level of processing responsiveness that a user, system, or subsystem senses as sufficiently immediate for a particular process or determination to be made, or that enables the processor to keep up with some external process.

The one or more target surfaces TS can comprise in whole or in part a metal surface, a glass surface, fabric surface, leather surface, etc. The one or more target surfaces TS may serve in whole or in part as various touchable surfaces of components located in the vehicle passenger cable, including but not limited to user interfaces, consoles, steering wheel, gear shift, door handles, seat belt, cupholder, etc. Embodiments are not limited thereto, and thus, this disclosure contemplates the one or more target surfaces TS to include other surfaces in the vehicle passenger cabin.

The one or more image or optical sensors 121 may be spatially arranged in an array configuration in close proximity or otherwise adjacent to one or more target surfaces TS in the vehicle passenger cabin to facilitate detection or capturing, as image data, microscopic images of the one or more target surfaces TS. The one or more optical sensors 121 may comprise an imaging microscope, an optical spectroscopic sensor, an infrared camera, and a camera having one or more microscopic lenses. Embodiments are not limited thereto, and thus, this disclosure contemplates the one or more optical sensors 121 comprising any suitable sensor architecture that permits practice of the one or more embodiments. The one or more optical sensors 121 may be operatively connected to one or more light sources to direct light on the one or more target surfaces TS during the capturing of image data. The one or more optical sensors 121 may be used in any combination, and may be used redundantly to validate and improve the accuracy of the detection. The one or more optical sensors 121 may be fixed in a position that does not change relative to the vehicle passenger cabin. Alternatively or additionally, the one or more optical sensors 121 may be manually or automatically moveable so as to change position relative to the vehicle passenger cabin in a manner which facilitates the capture of image data from different portions of the vehicle passenger cabin. The one or more optical sensors 121 (and/or the movement thereof) may be selectively controlled by the control module/ECU 101.

The one or more olfactory sensors 122 may be spatially arranged in an array configuration in close proximity or otherwise adjacent to one or more target surfaces TS in the vehicle passenger cabin to facilitate detection or capturing, as olfactory data, one or more of airborne bacteria, airborne chemicals emitted by bacteria, and airborne odor causing bacteria at the one or more target surfaces TS in the vehicle passenger cabin. Such bacteria may for example, be pathogenic bacteria. The olfactory sensors 122 may be configured to detect and recognize odors and identifies olfactory patterns associated with different odor causing bacteria. The one or more olfactory sensors 122 may comprise an airborne chemical sensor, a gas detector, and an electronic olfactory sensor. Embodiments, however, are not limited thereto. This disclosure contemplates the one or more olfactory sensors 122 comprising any suitable sensor architecture that permits practice of the one or more embodiments. The one or more olfactory sensors 122 may be used in any combination, and may be used redundantly to validate and improve the accuracy of the detection. The one or more olfactory sensors 122 may be fixed in a position that does not change relative to the vehicle passenger cabin. Alternatively or additionally, the one or more olfactory sensors 122 may be manually or automatically moveable so as to change position relative to the vehicle passenger cabin in a manner which facilitates the capture of image data from different portions of the vehicle passenger cabin. The one or more olfactory sensors 122 (and/or the movement thereof) may be selectively controlled by the control module/ECU 101.

Figure 4:
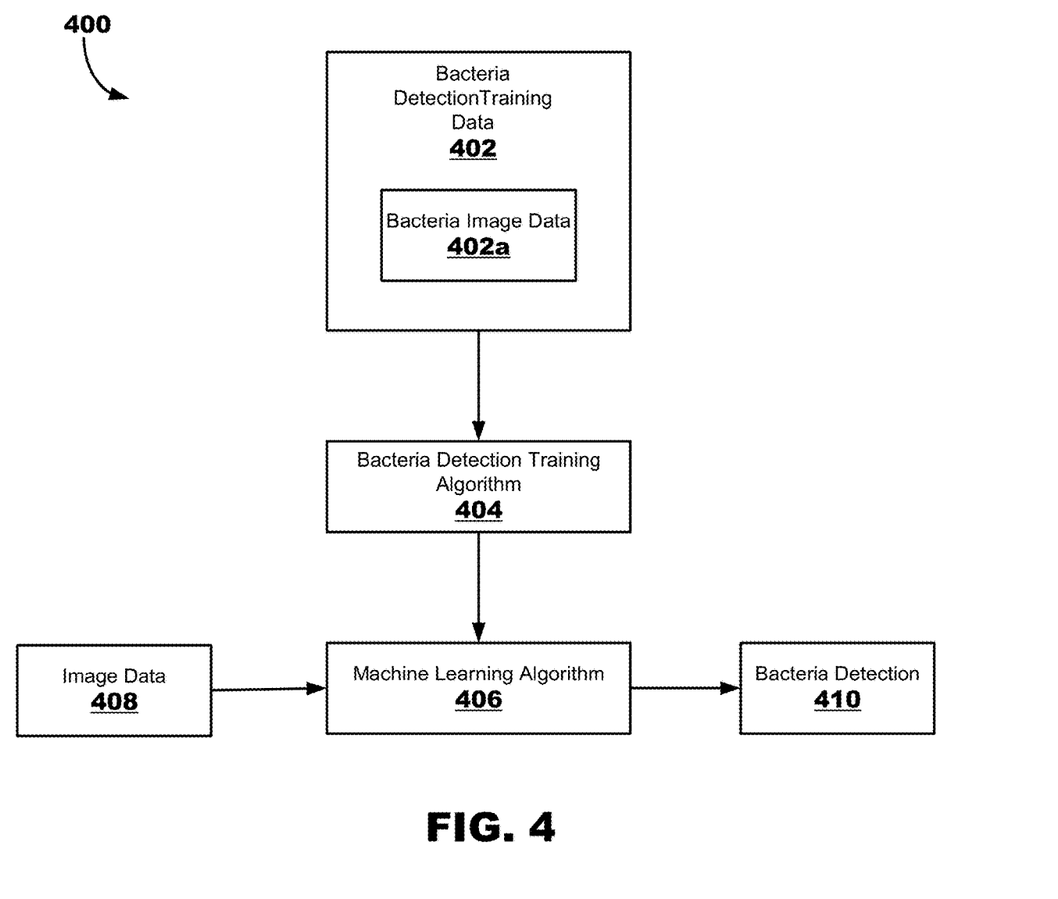
FIG. 4 illustrates a block diagram of an example training module for a cloud bacteria detection system, in one or more embodiments shown and described herein.
Figure 5:
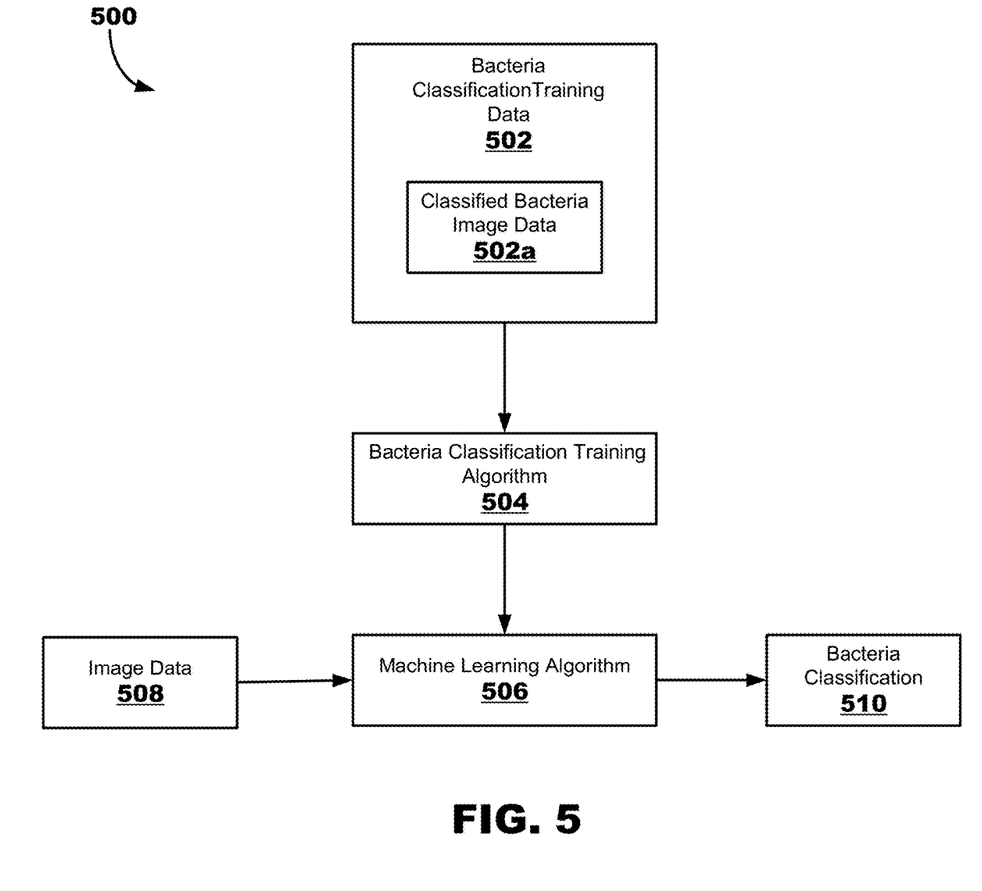
FIG. 5 illustrates a block diagram of an example training module for a cloud bacteria classification system, in one or more embodiments shown and described herein.
Figure 6:
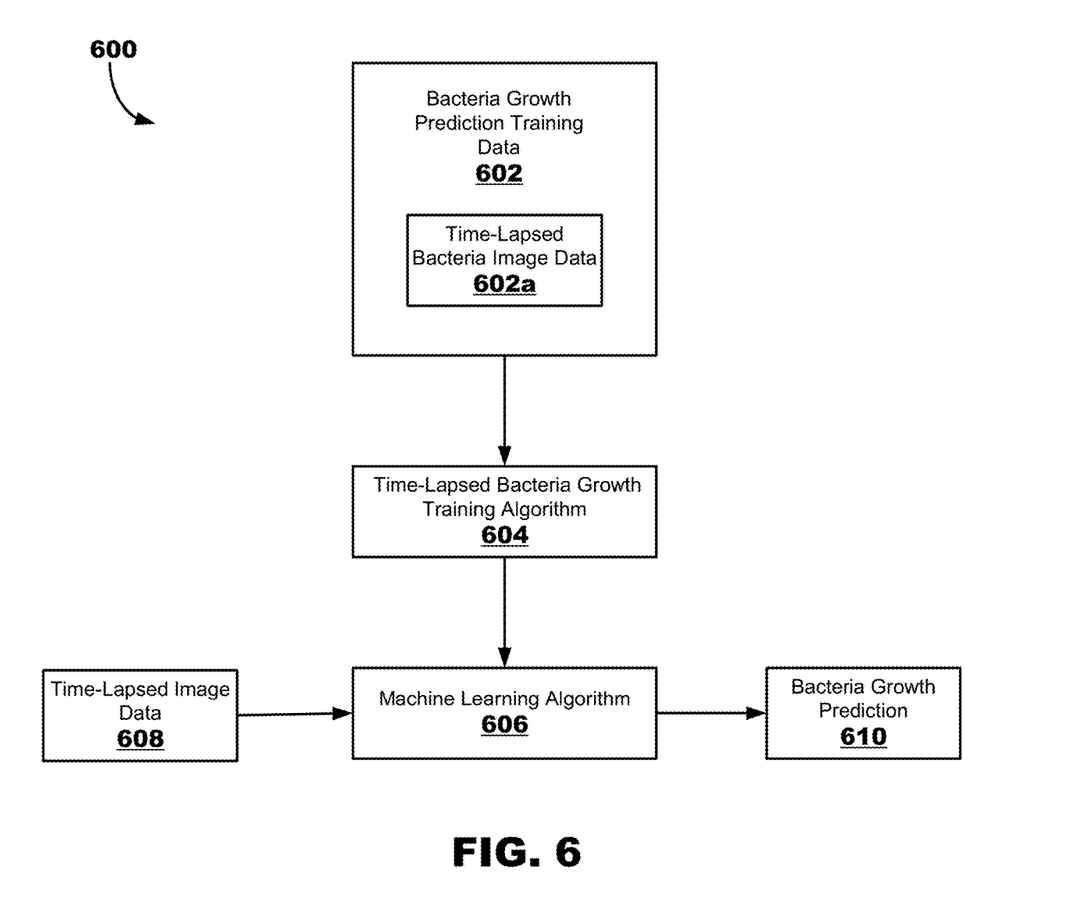
FIG. 6 illustrates a block diagram of an example training module for a cloud bacteria prediction system, in one or more embodiments shown and described herein.

In one or more embodiments, the captured image data and the captured olfactory data is stored in the one or more data stores 102 of the vehicle. Alternatively or additionally, the captured image data and the captured olfactory data is stored in the one or more data stores 302 of the one or more server computers 300 for purposes of being used as training data 402, 502, 602 to further enhance the machine learning algorithms as set forth, described, and/or illustrated herein.

The one or more vehicle systems 130 may comprise various operational systems and subsystems of the vehicle 100. Such systems and subsystems include, but are not limited to an HVAC system, a windows system, a sound system, a lighting system, a drive train system, a braking system, a steering system, a throttle system, a transmission system, a signaling system, and a navigation system. Embodiments, however, are not limited thereto, and thus, the vehicle 100 may comprise more, fewer or different systems and subsystems.

In the illustrated example of FIGS. 2 and 3, an example cloud bacteria detection and classification system for the vehicle 100 includes one or more cloud server computers 300 configured to store, execute, render, and transmit one or more bacteria detection and classification applications via a network 200 to one or more client devices.

In the illustrated example of FIG. 2, the client device comprises the control module/ECU 101 of the vehicle 100. The one or more optical sensors 121 are configured to capture one or more images of one or more target surfaces TS in the vehicle passenger cabin. In one or more embodiments, one or more of the control module/ECU 101 and the autonomous driving module 104 are operatively connected to control the one or more optical sensors 121 to send and receive image data relating to the captured images of the TS (and/or olfactory data from the one or more olfactory sensors 122). The control module/ECU 101 is configured to send, via network 200, the captured image data to the one or more cloud server computers 300 for purposes of processing the captured image data. In particular, the one or more cloud server computers 300 are configured to detect a presence of bacteria in the vehicle passenger cabin by applying a first machine learning algorithm to conduct differential image analysis of the captured image data. The one or more cloud server computers 300 are then configured to perform one or more of the following operations: store, execute, render, and transmit one or more bacteria detection and classification applications via the network 200 to one or more client devices, including the control module/ECU 101.

In the illustrated example of FIG. 3, the client device comprises a computing device 201. In one or more embodiments, the computing device 201 includes a desktop computer, laptop computer, smart phone, handheld personal computer, workstation, game console, cellular phone, mobile device, wearable computing device, tablet computer, convertible tablet computer, or any other electronic, microelectronic, or micro-electromechanical device for processing and communicating data. Embodiments, however, are not limited thereto. This disclosure contemplates the computing device 201 comprising any suitable architecture that permits practice of the one or more embodiments. In one or more embodiments, the computing device 201 is operatively connected to a mobile optical sensor device 221 (and a mobile olfactory sensor device 222) to send and receive image data from the mobile optical sensor device 221 relating to the captured images of the TS (and/or olfactory data from the mobile olfactory sensor device 222). The computing device 201 is configured to send, via network 200, the captured image data to the one or more cloud server computers 300 for purposes of processing the captured image data. In particular, the one or more cloud server computers 300 are configured to identify or otherwise detect a presence of bacteria in the vehicle passenger cabin by applying a first machine learning algorithm to conduct differential image analysis of the captured image data. The one or more cloud server computers 300 are then configured to perform one or more of the following operations: store, execute, render, and transmit one or more bacteria detection and classification applications via the network 200 to one or more client devices, including the computing device 201.

In the illustrated example of FIG. 4, in one or more embodiments, in a cloud bacteria detection system 400, a machine learning algorithm 406 may be trained and used to identify or detect bacteria in captured images at one or more target surfaces TS in the vehicle passenger cabin. The machine learning algorithm 406 may comprise a first neural network, such as, for example, a deep convolution neural network, or other machine learning algorithm for purposes of identifying or detecting bacteria. The machine learning algorithm 406 is trained using a bacteria detection training algorithm 404 based on bacteria detection training data 402. The bacteria detection training data 402 may comprise stored image data 402a relating to a plurality of images of bacteria. Using the training data 402, the bacteria detection training algorithm 404 may train the machine learning algorithm 406. Upon competition of training of the machine learning algorithm 406, the machine learning algorithm 406 may be implemented for purposes of identifying or detecting the bacteria by conducting differential image analysis of the captured image data 408. Using differential image analysis, the captured image data 408 is compared to image data of various types of bacteria stored in the one or more data stores 302 to derive at a bacteria detection 410. The stored image data 402a may include image data of previously-identified bacteria obtained via the machine learning algorithm 406.

In the illustrated example of FIG. 5, in one or more embodiments, in a cloud bacteria classification system 500, a machine learning algorithm 506 may be trained and used to classify bacteria in captured images at one or more target surfaces TS in the vehicle passenger cabin. The machine learning algorithm 506 may comprise a second neural network, such as, for example, a deep convolution neural network, or other machine learning algorithm for purposes of classifying bacteria. Alternatively, the machine learning algorithm 506 may comprise the first neural network. The machine learning algorithm 506 is trained using a bacteria classification training algorithm 504 based on bacteria classification training data 502. The bacteria classification training data 502 may comprise stored image data 502a relating to a plurality of images of classified bacteria. Using the bacteria classification training data 502, the bacteria classification training algorithm 504 may train the machine learning algorithm 506. Upon competition of training of the machine learning algorithm 506, the machine learning algorithm 506 may be implemented for purposes of classifying the bacteria by conducting differential image analysis of the captured image data 408. Using differential image analysis, the captured image data 508 is compared to image data of various types of classified bacteria stored in the one or more data stores 302 to derive at a bacteria classification 510. The stored image data 502a may include image data of previously-classified bacteria obtained via the machine learning algorithm 506.

In the illustrated example of FIG. 6, in one or more embodiments, in a cloud bacteria growth prediction system 600, a machine learning algorithm 606 may be trained and used to classify bacteria in captured images at one or more target surfaces TS in the vehicle passenger cabin. The machine learning algorithm 506 may comprise a third neural network, such as, for example, a deep convolution neural network, or other machine learning algorithm for purposes of classifying bacteria. Alternatively, the machine learning algorithm 606 may comprise the first neural network. The machine learning algorithm 606 is trained using a bacteria growth prediction training algorithm 604 based on bacteria growth training data 602. The bacteria growth training data 602 may comprise stored time-lapsed bacteria growth image data 602a relating to a plurality of images of time-lapsed classified bacteria. Using the bacteria growth training data 602, the bacteria growth training algorithm 604 may train the machine learning algorithm 606. Upon competition of training of the machine learning algorithm 606, the machine learning algorithm 606 may be implemented for purposes of predicting growth of the bacteria by conducting time-lapsed differential image analysis of captured image data 408 collected at time n and time n+1. Using time-lapsed differential image analysis, the time-lapsed captured image data 608 is compared to stored time-lapsed image data stored in the one or more data stores 302 to derive at a bacteria growth prediction 610. The stored bacteria growth image data 602a may include image data of previously-predicted bacteria growth obtained via the machine learning algorithm 606.

Figure 7:
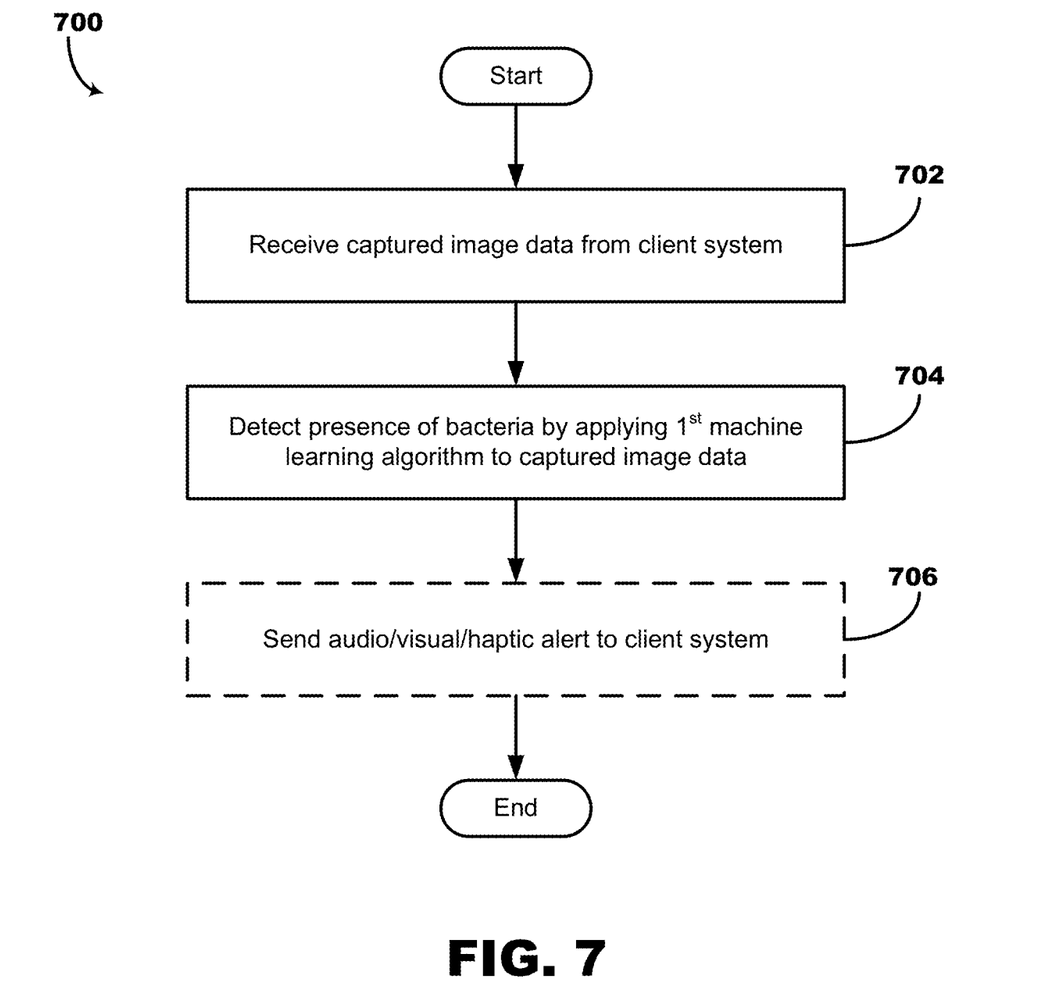
FIGS. 7 through 9 respectively illustrate a schematic diagram of example methods of detecting bacteria in a vehicle passenger cabin, in one or more embodiments shown and described herein.
Figure 8:
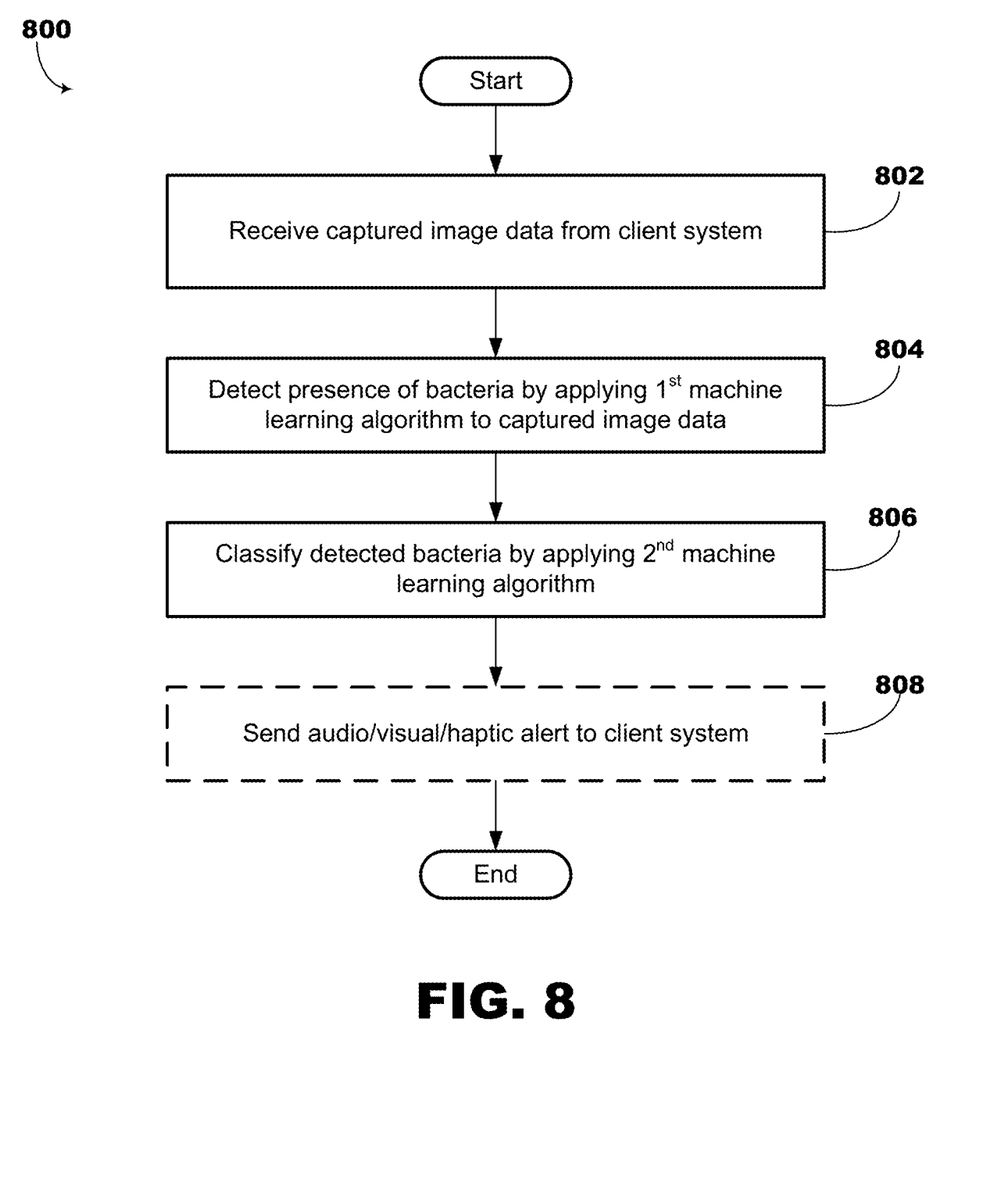
Figure 9:
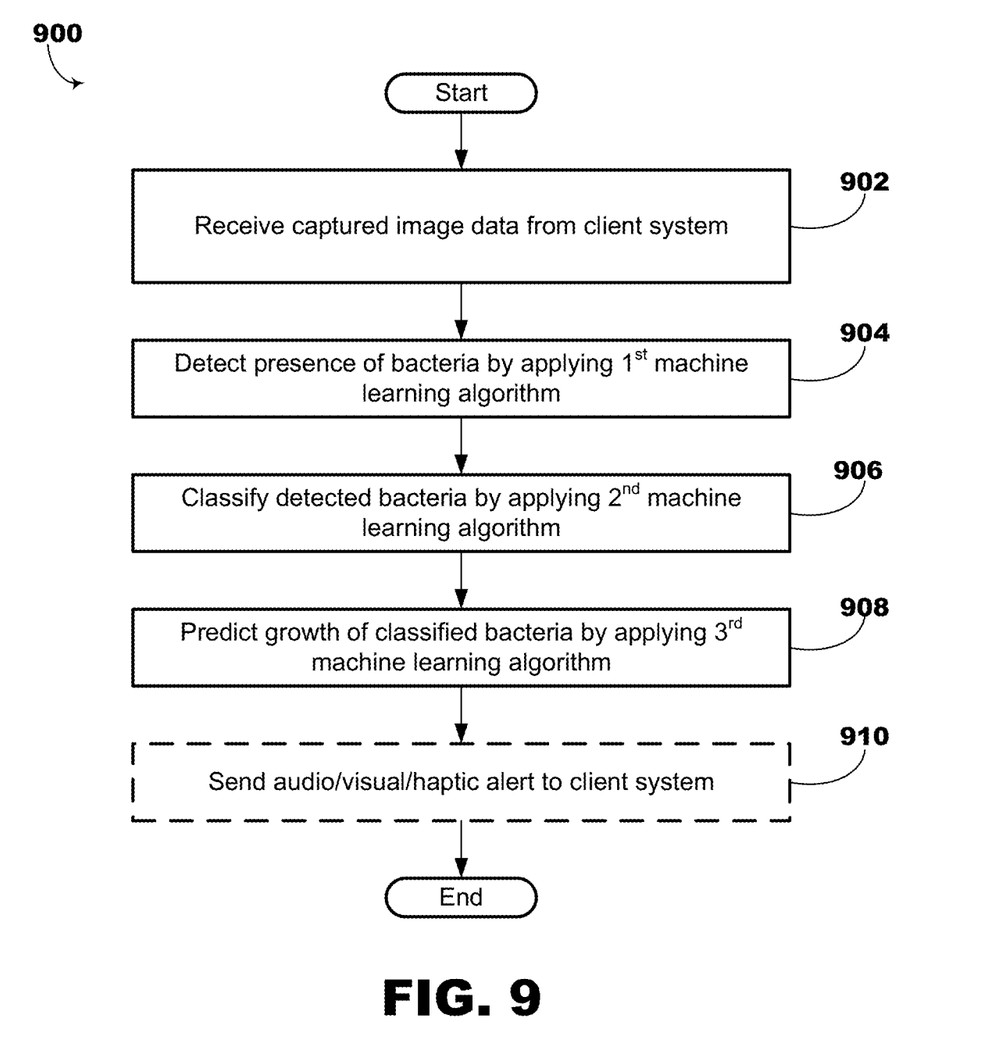

In the illustrated examples of FIGS. 7 to 9, a flowchart of methods 700, 800, and 900 of detecting bacteria in a vehicle passenger cabin. In one or more examples, the respective flowcharts of the methods 700, 800, and 900 may be implemented by one or processors 301 of the one or more network server computers 300.

In particular, the methods 700, 800, and 900 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In one or more examples, software executed by the one or more network server computers 300 provides functionality described or illustrated herein. In particular, software executed by the one or processors 301 is configured to perform one or more processing blocks of the methods 700, 800, and 900 set forth, described, and/or illustrated herein, or provides functionality set forth, described, and/or illustrated.

In the illustrated example of FIG. 7, illustrated process block 702 includes receiving, from a first client system, captured image data relating to one or more microscopic images of one or more target surfaces in a vehicle passenger cabin.

The method 700 may then proceed to illustrated process block 704, which includes detecting a presence of bacteria in the vehicle passenger cabin by applying a first machine learning algorithm to conduct differential image analysis of the captured image data.

The method 700 can terminate or end after completion of illustrated process block 704. Alternatively, the method 700 may then proceed to illustrated process block 706, which includes sending an audio, visual, or haptic alert to the client system notifying them of the detection of the bacteria. The method 700 may terminate or end after execution of process block 706.

In the illustrated example of FIG. 8, illustrated process block 802 includes receiving, from a first client system, captured image data relating to one or more microscopic images of one or more target surfaces in a vehicle passenger cabin.

The method 800 may then proceed to illustrated process block 804, which includes detecting a presence of bacteria in the vehicle passenger cabin by applying a first machine learning algorithm to conduct differential image analysis of the captured image data relating.

The method 800 may then proceed to illustrated process block 806, which includes classifying the detected bacteria by applying a second machine learning algorithm to conduct classification analysis of the captured image data.

The method 800 can terminate or end after completion of illustrated process block 806. Alternatively, the method 800 may then proceed to illustrated process block 808, which includes sending an audio, visual, or haptic alert to the client system user or subscriber of the detection notifying them of the detection and classification of the bacteria. The method 800 may terminate or end after execution of process block 808.

In the illustrated example of FIG. 9, illustrated process block 902 includes receiving, from a first client system, captured image data relating to one or more microscopic images of one or more target surfaces in a vehicle passenger cabin.

The method 900 may then proceed to illustrated process block 904, which includes detecting a presence of bacteria in the vehicle passenger cabin by applying a first machine learning algorithm to conduct differential image analysis of the captured image data.

The method 900 may then proceed to illustrated process block 906, which includes classifying the detected bacteria by applying a second machine learning algorithm to conduct classification analysis of the captured image data.

The method 900 may then proceed to illustrated process block 908, which includes predicting growth of the classified bacteria by applying a third machine learning algorithm to conduct time-lapsed differential image analysis of the captured image data.

The method 900 can terminate or end after completion of illustrated process block 908. Alternatively, the method 900 may then proceed to illustrated process block 910, which includes sending an audio, visual, or haptic alert to the client system notifying them of the detection and classification of the bacteria, and the predict growth of the bacteria. The method 900 may terminate or end after execution of process block 910.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A computer system, comprising:
a computing server having one or more processors; and
a non-transitory memory operatively coupled to the one or more processors comprising a set of instructions executable by the one or more processors to cause the one or more processors to:
receive, from a client system, captured image data relating to one or more images of one or more target surfaces in a vehicle passenger cabin;
detect a presence of bacteria in the vehicle passenger cabin by applying a first machine learning algorithm to conduct differential image analysis of the captured image data; and
predict growth of classified bacteria by applying a second machine learning algorithm to conduct time-lapsed differential image analysis of the captured image data.

2. The computer system of claim 1, wherein, prior to applying the first machine learning algorithm, the one or more processors are to execute the set of instructions to train a convolutional neural network to detect bacteria based on one or more of stored bacteria image data and wireless network bacteria image data.

3. The computer system of claim 1, wherein the one or more processors are to execute the set of instructions to classify the detected bacteria by applying a third machine learning algorithm to conduct classification analysis of the captured image data.

4. The computer system of claim 3, wherein, prior to applying the third machine learning algorithm, the one or more processors are to execute the set of instructions to train a convolutional neural network to classify the detected bacteria based on one or more of stored bacteria image data and wireless network bacteria image data.

5. The computer system of claim 1, wherein, prior to applying the second machine learning algorithm, the one or more processors are to execute the set of instructions to train a convolutional neural network to predict growth of the classified bacteria based on one or more of stored bacteria image data and wireless network bacteria image data.

6. The computer system of claim 1, wherein the one or more processors are to execute the set of instructions to, in response to the detection, send one or more of an audio alert, a visual alert, and a haptic alert to the client system.

7. A computer program product including at least one non-transitory computer readable medium comprising a set of instructions, which when executed by one or more processors of a computing server, cause the computing server to:
receive, from a client system, captured image data relating to one or more images of one or more target surfaces in a vehicle passenger cabin;
detect a presence of bacteria in the vehicle passenger cabin by applying a first machine learning algorithm to conduct differential image analysis of the captured image data; and
predict the growth of classified bacteria by applying a second machine learning algorithm to conduct time-lapsed differential image analysis of the captured image data.

8. The computer program product of claim 7, wherein, prior to applying the first machine learning algorithm, the one or more processors are to execute the set of instructions to train a convolutional neural network to detect bacteria based on one or more of stored bacteria image data and wireless network bacteria image data.

9. The computer program product of claim 7, wherein the one or more processors are to execute the set of instructions to classify the detected bacteria by applying a third machine learning algorithm to conduct classification analysis of the captured image data.

10. The computer program product of claim 9, wherein, prior to applying the third machine learning algorithm, the one or more processors are to execute the set of instructions to train a convolutional neural network to classify the detected bacteria based on one or more of stored bacteria image data and wireless network bacteria image data.

11. The computer program product of claim 7, wherein, prior to applying the second machine learning algorithm, the one or more processors are to execute the set of instructions to train a convolutional neural network to predict growth of the classified bacteria based on one or more of stored bacteria image data and wireless network bacteria image data.

12. The computer program product of claim 7, wherein the one or more processors are to execute the set of instructions to, in response to the detection, send one or more of an audio alert, a visual alert, and a haptic alert to the client system.

13. A method of detecting bacteria in a vehicle passenger cabin, comprising:
receiving, from a first client system, captured image data relating to one or more images of one or more target surfaces in a vehicle passenger cabin;
detecting a presence of bacteria in the vehicle passenger cabin by applying a first machine learning algorithm to conduct differential image analysis of the captured image data; and
predicting the growth of classified bacteria by applying a second machine learning algorithm to conduct time-lapsed differential image analysis of the captured image data.

14. The method of claim 13, further comprising, prior to applying the first machine learning algorithm:
training a convolutional neural network to detect bacteria based on one or more of stored bacteria image data and wireless network bacteria image data.

15. The method of claim 13, further comprising classifying the detected bacteria by applying a third machine learning algorithm to conduct classification analysis of the captured image data.

16. The method of claim 15, further comprising, prior to applying the third machine learning algorithm:
training a convolutional neural network to classify the detected bacteria based on one or more of stored bacteria image data and wireless network bacteria image data.

17. The method of claim 13, further comprising, prior to applying the second machine learning algorithm:
training a convolutional neural network to predict growth of the classified bacteria based on one or more of stored bacteria image data and wireless network bacteria image data.

* * * * *